March 17, 1970  N. ALWALL ET AL  3,501,011
LIQUID DISTRIBUTION MEANS IN DIALYSIS MEANS FOR
PURIFYING BLOOD OR OTHER LIQUIDS
Filed March 4, 1968  3 Sheets-Sheet 1

INVENTORS
Nils Alwall
Nils Olov Vilhelm Hagström
Bo Lennart Östergren
Gerhard Riede By Pierce, Scheffler & Parker
Attorneys

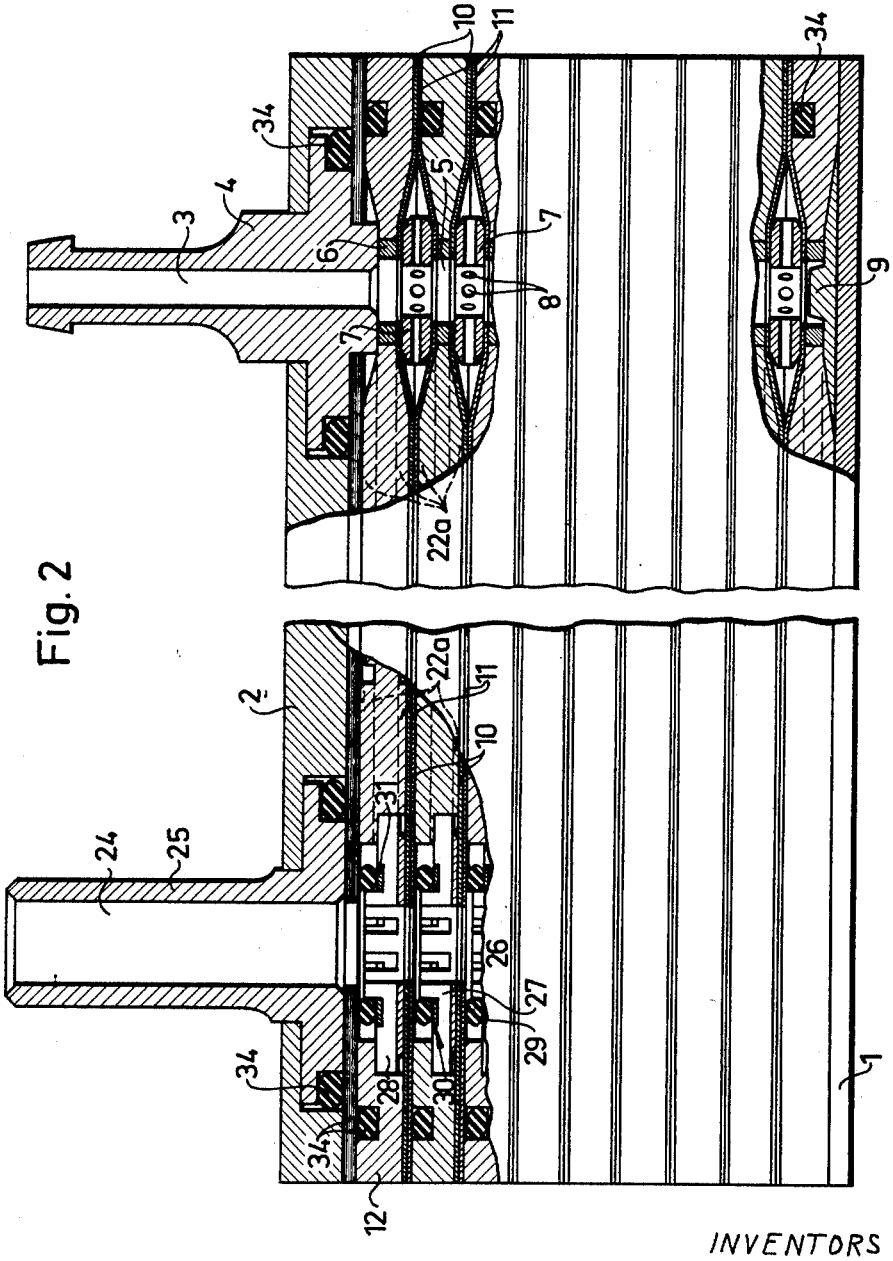

March 17, 1970 N. ALWALL ET AL 3,501,011
LIQUID DISTRIBUTION MEANS IN DIALYSIS MEANS FOR
PURIFYING BLOOD OR OTHER LIQUIDS
Filed March 4, 1968 3 Sheets-Sheet 3

INVENTORS
Nils Alwall
Nils Olov Vilhelm Hagström
Bo Lennart Östergren
Gerhard Riede By Pierce, Scheffler & Parker
Attorneys.

United States Patent Office 3,501,011
Patented Mar. 17, 1970

3,501,011
LIQUID DISTRIBUTION MEANS IN DIALYSIS MEANS FOR PURIFYING BLOOD OR OTHER LIQUIDS
Nils Alwall, Nils Olov Vilhelm Hagström, and Bo Lennart Östergren, Lund, and Gerhard Riede, Eslov, Sweden, assignors to AB Gambro, Lund, Sweden, a company of Sweden
Filed Mar. 4, 1968, Ser. No. 710,254
Claims priority, application Sweden, Mar. 6, 1967, 3,013/67
Int. Cl. B01d 31/00, 13/00
U.S. Cl. 210—321      5 Claims

ABSTRACT OF THE DISCLOSURE

A dialysis device having alternating spacing discs and pairs of membranes and an inlet channel for the dialysis liquid traversing the assembly with means for introducing and distributing the dialysis liquid into the space outside each pair of membranes while sealing the membranes together.

---

Figure 1:
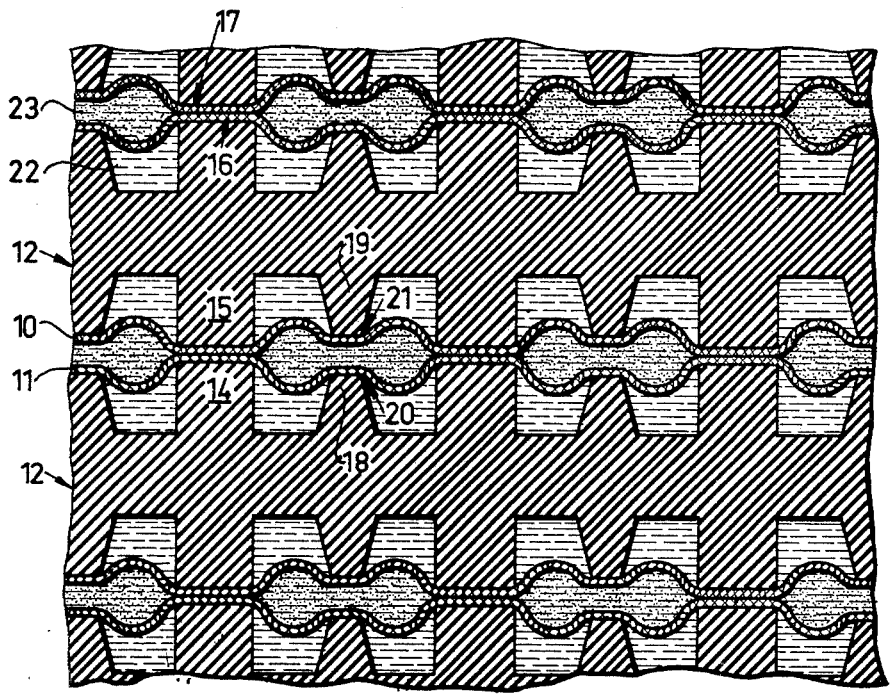

The present invention relates to dialysis means for purifying blood or other liquids, where the impurities in the blood are caused to diffuse through semi-permeable diaphragms restricting the liquid blood and will enter a purifying liquid by means of which the impurities are removed. In the means according to the invention these diaphragms are disposed in pairs between the spacing discs forming spaces for the purifying liquid together with the exterior sides of the double diaphragms, a package of discs and double diaphragms being perforated by channels for the blood and the purifying liquid. In these channels there are provided distribution means for the respective liquids.

Dialysis means of the above kind is used in the first place as a so-called artificial kidney. In order to save space it is desirable to make the said spacing discs as thin as possible. This will, however, cause difficulties at the distribution of the liquids flowing between the diaphragms or between the diaphragms and the spacing discs. For the purpose of distributing the blood it is possible to provide small annular buttons having an axially through aperture and bored apertures departing radially from the said aperture. If a corresponding construction should be used for the purifying liquid, which on account of its volume requires considerably larger channels, this would call for unnecessarily thick buttons and consequently spacing discs of extra thickness.

The invention instead solves the problems by using plates as distributing means for the dialysis liquid which are lowered into the spacing discs and have distribution passages provided in their surface which are connected with corresponding passages in the surface of the spacing discs, each plate being provided with a sealing ring or the like pressing the two adjacent diaphragms towards the next plate, simultaneously producing an effective seal between the spaces for the blood and the spaces for the purifying liquid.

When using the dialysis means according to the invention as an artificial kidney there is, however, required a relatively high sealing pressure since the pressure difference between the blood and the purifying liquid may amount to about 1 kp./cm.². Consequently there is a risk that the said sealing rings will be pressed into the distribution passages. According to the invention it is possible, in order to prevent this, to dispose a thin steel ring or the like beneath the sealing ring.

Preferably, the said plates are of circular shape and provided with an annular axially projecting collar on which a steel ring of the said kind may first be threaded and thereupon a sealing ring. This construction facilitates the mounting of the kidney considerably.

Alternatively, the sealing rings together with the steel rings may be partly lowered into a widened portion of the central liquid passage from which the liquid is distributed.

The distribution passages preferably consist of radial grooves milled or cast in the surface of the plates. The said grooves may also extend through the axially projecting collar, where such a collar is provided. In order to reduce the adjusting problems at the kidney the said distribution passages are preferably caused to extend into a common peripheral annular outer distribution passage. The said outer passage may then be connected in one or more places and in an arbitrary manner with the channels for the purifying liquid provided in the surface of the spacing disc.

The invention is preferably intended to be applied to an artificial kidney of the kind described in U.S. Patent 3,411,630 but may of course also be applied to other similar constructions.

Figure 3:
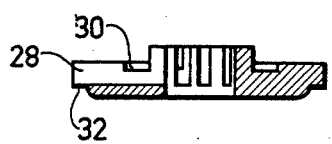
Figure 4:
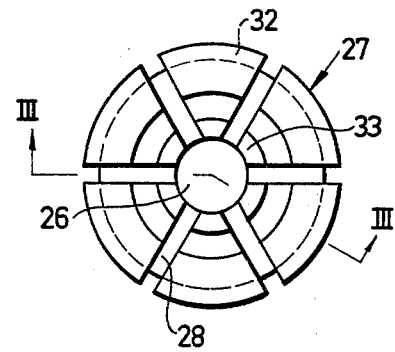
Figure 5:
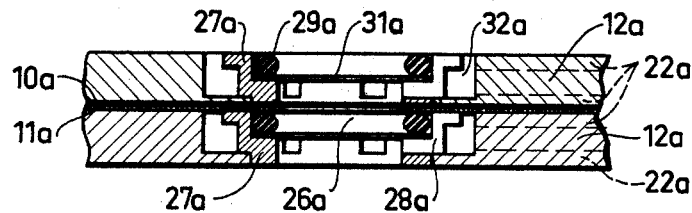
Figure 6:
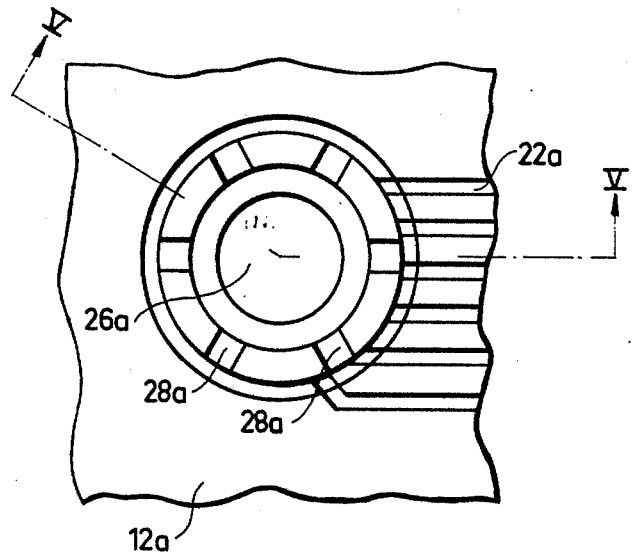

The invention will be described in greater detail in the following with reference to the accompanying drawings showing a couple of preferred embodiments of the invention described by way of example, and in which FIG. 1 is a relatively powerful enlargement of a partial section through a dialysis means according to the invention, FIG. 2 is partly a section of the inlets for the two kinds of liquid flowing through the means, the main portion of the intermediate spacing discs being, however, cut away, FIGS. 3 and 4 show a vertical section and a horizontal section, respectively, of a detail which is part of the means according to the invention, and FIGS. 5 and 6 are corresponding views of the same detail in a modified embodiment.

The dialysis means shown in the drawings comprises a base plate 1 and a top plate 2. Between these there are mounted a number of spacing discs 12, the construction of which is clearly seen from FIG. 1. Between the spacing discs 12 there are mounted semipermeable diaphragms 10 and 11 in pairs. In order that the volume of the means may be as carefully determined as possible, the diaphragms 10 and 11 are kept well pressed together by means of the top surfaces 16 and 17 on a great number of shoulders 14 and 15 provided on each spacing disc. Between these shoulders there are formed on one hand channels 22 for the purifying liquid, on the other hand channels 23 for the blood to be purified. The channels 23 are pressed together still more by the top surfaces 20 and 21 of the shoulders 18 and 19. The said shoulders 18 and 19 are lower than the shoulders 14 and 15. Furthermore, the top surfaces are considerably smaller than the top surfaces 16 and 17.

The problem is now to lead the blood to the channels 23 and the purifying liquid to the channels 22. The blood is introduced through a channel 3 into an inlet member 4. From there it is passed through a channel 5 which is formed by sealing rings 6 and small buttonlike rings 7. The latter rings 7 are mounted between the two diaphragms in each pair of such diaphragms. From the central channel 5 the blood is allowed to pass out between the diaphragms through radially directed passages 8. The channel 5 is plugged below by an end washer 9.

The purifying liquid which preferably consists of a salt solution, e.g. a common salt solution, is made to enter through a channel 24 in an inlet member 25. The channel 25 continues directly in a channel 26, which is formed by a number of annular plates 27. The construction of these plates 27 will best appear from FIGS. 3 and 4. From the inner central passage 26 there departs a number of radial passages 28 with even distribution. These passages 28 are provided in the surface of the plate 27, contrary to what is the case with the blood distribution channels 8.

On top of each plate 27 there is provided a gasket 29, as appears from FIG. 2. This gasket presses the two diaphragms 10 and 11 lying on top thereof against the next plate 27 lying thereabove and being of the same kind. This provides for an effective seal for the blood so that this cannot penetrate into the salt solution and vice versa.

Under the high sealing pressures used here there is a risk that the sealing rings 29 will be pressed down into the grooves 28. For this reason the plate 27 is provided with a cut-out portion 30 in which there is mounted a steel ring 31. This steel ring 31 effectively prevents any tendency of pressing the sealing ring 29 into the grooves.

In order that the plates 27 may easily be adjusted in relation to salt solution channels not shown but provided in the spacing discs 12, the plates 27 are provided with an outer annular groove 32 which is in contact with each one of the radial grooves 28. As a consequence of this, the plates 27 do not have to be adjusted to a determined angular position in relation to the apertures in the spacing discs.

Next to the central passage 26 the plate 27 is provided with an axially directed annular collar 33. Onto this collar the steel ring 31 is first threaded, whereupon the gasket 29 is mounted. In FIG. 2 reference numeral 34 designates a number of different gaskets.

FIGS. 5 and 6, finally, show an alternative embodiment of the liquid distribution plates 27. Since the construction shown here is basically the same as the one shown in FIGS. 3 and 4, the same reference numerals will be used as in these figures, although with the addition of the letter a. The reference numeral 26a consequently denotes the passage formed by the central aperture of the plates 27a. The numeral 28a designates radial outlet channels. Sealing rings 29a and steel rings 31a are recessed into a cut-out portion in the plate in this embodiment, for which reason this cut-out portion may be said to constitute a widened portion of the central aperture 26a. The advantage of this is that the central aperture can be made larger without making the outer dimensions of the plate greater. Reference numeral 32a designates a peripheral channel formed between the distribution plate 27a and the spacing disc 12a with its distribution channels 22a. Reference numerals 10a and 11a, finally, designate the diaphragms squeezed between the spacing discs 12a.

The plates 27 do not have to be circular in shape. Other shapes are also possible. Furthermore, the plates 27 may be provided with additional distribution passages in addition to the annular passage 32. Thus, an annular passage of this kind may be provided on the top of the plate according to FIG. 3 in the surface between the circular cut-out portion 30 and the periphery of the plate.

We claim:
1. A dialysis device for purifying blood, in which pairs of semi-permeable membranes are disposed between spacing discs having channels on the surfaces thereof, each pair of membranes having a space therebetween for passage of blood and the spacing discs providing spaces on both sides of each pair of membranes for passage of a purifying liquid so that impurities in the blood are removed therefrom by diffusion through the semi-permeable membranes into the purifying liquid and in which a transverse channel is provided through a superposed plurality of spacing discs and membranes for introducing the purifying liquid into the spaces therefor, the improvement of means for introducing and distributing the purifying liquid which comprises an annular plate having distribution channels on one surface thereof extending from the central opening to the periphery thereof, the juxtaposed spacing disc being provided with a recess about the channel therethrough for receiving said annular plate, said distribution channels communicating with the channels on the surfaces of the spacing disc, resilient annular sealing means between said annular plate and the adjacent pair of membranes for effecting a fluid-tight seal between the pair of membranes and between the membranes and the adjacent annular plate, and restraining means between the sealing means and the annular plate for preventing said sealing means from extending into and restricting flow through said distribution channels when the superposed plurality of spacing discs and pairs of membranes are secured tightly together.

2. A device as claimed in claim 1 wherein said annular plate is provided with an annular recess to receive said restraining means.

3. A device as claimed in claim 1 wherein the distribution channels are disposed substantially radially on said annular plate, said annular plate is provided with an outer peripheral channel into which said radial channels open.

4. A device as claimed in claim 1 wherein said restraining means is an annulus composed of non-deformable material having a cross section adapted to receive said resilient annular sealing means.

5. A device as claimed in claim 4 wherein the annular recess in said annular plate receives said restraining means and said resilient annular sealing means.

References Cited

UNITED STATES PATENTS

| 2,686,154 | 8/1954 | MacNeill | 210—321 |
| 3,323,652 | 6/1967 | Huffman | 210—321 |
| 3,323,653 | 6/1967 | Lacey et al. | 210—321 |
| 3,411,630 | 11/1968 | Alwall et al. | 210—321 |
| 3,413,095 | 11/1968 | Bramson | 210—321 X |

OTHER REFERENCES

Galletti et al., "A Membrane Lung-Kidney," from Trans Amer. Soc. for Artif. Internal Organs, Vol. VIII, received in Patent Office May 28, 1962, 401 pp., pp. 47–52 relied on.

REUBEN FRIEDMAN, Primary Examiner

F. A. SPEAR, Jr., Assistant Examiner